(12) United States Patent
Macmichael

(10) Patent No.: US 7,834,279 B2
(45) Date of Patent: Nov. 16, 2010

(54) WEIGHING APPARATUS WITH IMPROVED CLEANING CAPABILITIES

(75) Inventor: Donald Bruce Atherton Macmichael, Cambridge (GB)

(73) Assignee: Pfizer Inc, New York, NY (US)

( * ) Notice: Subject to any disclaimer, the term of this patent is extended or adjusted under 35 U.S.C. 154(b) by 0 days.

(21) Appl. No.: 11/575,108

(22) PCT Filed: Aug. 9, 2005

(86) PCT No.: PCT/GB2005/003147
§ 371 (c)(1),
(2), (4) Date: Mar. 12, 2007

(87) PCT Pub. No.: WO2006/030171
PCT Pub. Date: Mar. 23, 2006

(65) Prior Publication Data
US 2008/0041637 A1    Feb. 21, 2008

(30) Foreign Application Priority Data
Sep. 16, 2004  (GB) ................... 0420659.5

(51) Int. Cl.
*G01G 21/30*  (2006.01)
(52) U.S. Cl. .......................... 177/238; 177/262
(58) Field of Classification Search ............. 177/145, 177/146, 154, 156, 180, 238, 244, 262
See application file for complete search history.

(56) References Cited

U.S. PATENT DOCUMENTS

| | | | | |
|---|---|---|---|---|
| 3,444,943 A | * | 5/1969 | Tytus ......................... | 177/180 |
| 4,548,288 A | * | 10/1985 | Komoto ....................... | 177/180 |
| 4,609,061 A | * | 9/1986 | Jacobsson ................... | 177/180 |
| 5,064,009 A | * | 11/1991 | Melcher et al. ............. | 177/245 |
| 5,115,876 A | * | 5/1992 | Chang et al. ................ | 177/145 |
| 5,850,057 A | * | 12/1998 | Veillette ..................... | 177/212 |
| 6,150,618 A | * | 11/2000 | Chou .......................... | 177/145 |

(Continued)

FOREIGN PATENT DOCUMENTS

EP    0118231 A2    9/1984

(Continued)

*Primary Examiner*—Randy W Gibson
(74) *Attorney, Agent, or Firm*—Jennifer A. Kispert; James T. Jones

(57) ABSTRACT

A weighing apparatus comprising a weighing pan (20) for supporting on an upper surface thereof an object (21) to be weighed, a support for the weighing pan (20), the support contacting a lower surface of the weighing pan and comprising an elongate member (23) extending downwardly from the weighing pan (20), the elongate member (23) extending through a hole (24) provided in a floor (36), located beneath the weighing pan (20), of a weighing pan region of the apparatus, a weighing mechanism (44) located beneath the floor (36) of the weighing pan region in a weighing mechanism region of the apparatus, the elongate member (23) connecting with the weighing mechanism, and a drive means (28) for selectively moving the weighing pan (20) between an upper position, at which the weighing pan (20) is spaced from the floor (36), and a lower position, at which the weighing pan (20) contacts the floor (36) in a sealing relationship for preventing material in the weighing pan region from passing through the hole (24) into the weighing mechanism region.

20 Claims, 3 Drawing Sheets

U.S. PATENT DOCUMENTS

| | | | |
|---|---|---|---|
| 6,329,611 B1 * | 12/2001 | Abe et al. | 177/124 |
| 6,600,112 B2 * | 7/2003 | Iseli | 177/154 |
| 6,923,449 B2 * | 8/2005 | Burkhard et al. | 277/412 |
| 7,411,137 B2 * | 8/2008 | Sandberg et al. | 177/154 |
| 2001/0027822 A1 | 10/2001 | Bertolo | |
| 2003/0067119 A1 | 4/2003 | Burkhard et al. | |

FOREIGN PATENT DOCUMENTS

| | | | | |
|---|---|---|---|---|
| EP | 0118231 | A3 | 9/1984 | |
| EP | 1031823 | A1 | 8/2000 | |
| EP | 1146322 | A2 | 10/2001 | |
| EP | 1146322 | A3 | 10/2001 | |
| EP | 1302757 | A2 | 4/2003 | |
| EP | 1302757 | A3 | 4/2003 | |
| JP | 62-167414 | A * | 7/1987 | 177/262 |

* cited by examiner

WEIGHING APPARATUS WITH IMPROVED CLEANING CAPABILITIES

The present invention relates to a weighing apparatus.

The accurate dispensing of medicament products in powder form by gravimetric means is widely used in the laboratory environment. Also, there is increasing use of gravimetric dispensing in manufacturing equipment.

Typically a container into which the medicament powder is to be received is placed upon the pan of a precision weighing apparatus. The weight of the container is deducted automatically from the display of the weighing apparatus to provide an initial display value of zero weight. This is known as taring. As powder is added to the container on the pan the weight displayed then shows only the powder weight. When the correct amount has been added, the container and the powder in it are removed from the pan.

Care needs to be taken during this process to ensure that no powder falls onto the pan as this would be measured by the weighing apparatus as being delivered whereas the powder would not actually have been added to the container. To ensure that any powder inadvertently missing the container can be detected visually the upper surface of the pan is normally flat, with smooth features and edges, and also the pan needs to be cleaned before use.

However for the pan to be able to transfer the weight on it to the weighing apparatus it is important that no part of the pan or any of the mechanism connecting the pan to the weighing apparatus touches any other part of the apparatus as this may lead to an error in the measurement. Thus weigh apparatuses may either hang a pan from a support beam above the object or support the pan from underneath using a linkage which passes through the fixed surface of the apparatus via a hole shaped and dimensioned to provide a clearance.

Typical arrangements are shown in FIGS. 1 and 2.

Referring to FIG. 1, in a known weighing apparatus a load cell 1 which measures the weight is attached to a frame 2 and supports a pan 3, hanging below the load cell 1, on which an object 4 to be weighed is placed. The surface 5 below the pan 3 and spaced therefrom can therefore be continuous and accordingly can be easily cleaned, as can the pan 3 when it is removed from the apparatus by lifting off the pan 3 from a hook 6 connecting the pan 3 to the load cell 1.

However the pan 3, as it is suspended from the hook 6, can swing about which generates forces on the load cell 1, giving errors in the reading unless a long time is taken to average the readings.

In the weighing apparatus arrangement shown in FIG. 2, a load cell 11 is mounted on a base 12 of a frame 13 of a known weighing apparatus with the pan 14 above the load cell 11. To protect the load cell 11a linkage coupling the load cell 11 to the pan 14 is normally used. This is shown in FIG. 2 as a rod 15 passing through a hole 16 in the frame 13.

Such an arrangement settles much quicker than does the hanging arrangement of FIG. 1, reducing the time necessary to take an accurate reading.

However cleaning of such an arrangement is difficult as any liquid used may penetrate into the mechanism of the weighing apparatus. Cleaning is also difficult because the mechanism of the weighing apparatus is delicate and vigorous wiping against the weighing pan will damage the mechanism unless the pan is secured. As a consequence cleaning requires a degree of skill.

Therefore there is a need for such a weighing apparatus constructed to enable that a rapid and reliable clean down can be accomplished, even by unskilled persons.

This invention aims at least partially to fulfil this need.

Accordingly, the present invention provides a weighing apparatus comprising a weighing pan for supporting on an upper surface thereof an object to be weighed, an elongate member connected thereto, the elongate member extending through a hole and connecting the weighing pan to a weighing mechanism, the hole being provided in a barrier formed in between a weighing pan region and a weighing mechanism region, and a drive means for selectively moving the weighing pan and the elongate member between a first position in which the weighing pan and member are spaced from the barrier and a second position at which at least one of the weighing pan and elongate member contacts the barrier in a sealing relationship for preventing material in the weighing pan region from passing through the hole into the weighing mechanism region.

The weighing pan and the associated elongate member may therefore be clamped in the sealed position, and in this sealed and clamped condition it is unlikely that the delicate internal mechanism of the weighing apparatus will be damaged.

The weighing apparatus of the invention accordingly can provide a surface on to which an object may be placed such that the force exerted on the surface by the weight of the object is accurately conveyed to a weighing apparatus. This surface can also have the additional property of being able to be sealed against another surface which is not coupled to the weighing apparatus, such that there is a water tight seal between the two surfaces, and preferably both surfaces are smooth and without rebated features which would be difficult to clean.

It is not necessary for the two surfaces to be sealed together whilst the object is being weighed, and hence a mechanism can be used to switch between the weighing and sealed states.

Preferably, the elongate member extends downwardly from the weighing pan and supports the pan by contacting a lower surface of the weighing pan, the barrier is a floor, located beneath the weighing pan, of the weighing pan region, the weighing mechanism being located beneath the floor of the weighing pan region in the weighing mechanism region of the apparatus, and the first position is an upper position, at which the weighing pan is spaced from the floor, and the second position is a lower position, at which the weighing pan contacts the floor in a sealing relationship.

Preferably, the apparatus further comprises a sealing device located on at least one of the weighing pan, the elongate member and the barrier for effecting the sealing relationship therebetween when the weighing pan is at the second position.

Preferably, the sealing device comprises at least one sealing element provided on the lower surface of the weighing pan and/or the elongate element.

Preferably, the sealing device extends circumferentially around the weighing pan and/or the elongate member.

Preferably, the weighing mechanism is connected to a lower end of the elongate member.

Preferably, the weighing mechanism region is located in a chamber of the weighing apparatus which is sealed when the weighing pan and the barrier are in a sealed relationship.

In one preferred aspect, the drive means comprises an actuator for selectively applying a force on the elongate member thereby to urge the weighing pan and the elongate member into the second position.

Preferably, the actuator applies a downwardly directed force to a laterally extending arm of the elongate member.

Preferably, the weighing mechanism comprises a load cell.

Preferably, the apparatus further comprises a compliant element for applying a bias to the elongate member against which bias the actuator applies the force.

Preferably, the bias of the compliant element is upwardly directed and the force of the actuator is downwardly directed.

In another preferred aspect, the weighing mechanism comprises a coil, the coil being connected to the lower end of the elongate member, a flexural mount for the coil flexibly connecting the coil to a frame of the weighing apparatus to enable the coil to move relative to a permanent magnet which is attached to a frame of the weighing apparatus whereby the coil can move relative to the permanent magnet.

Preferably, the drive means are comprised in the weighing mechanism and are adapted to urge the coil carrying the elongate member and the weighing pan downwardly to achieve the sealing relationship between the weighing pan and/or the elongate member and the barrier.

Embodiments of the present invention will now be described by way of example only with reference to the accompanying drawings, in which:—

Figure 1:
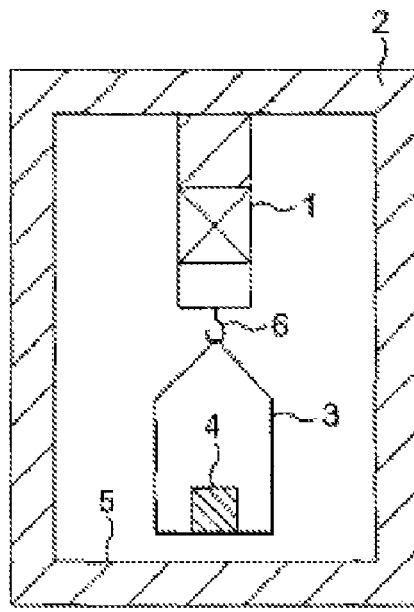
FIG. 1 is a schematic sectional view, from one side, through a first known weighing apparatus.
Figure 2:
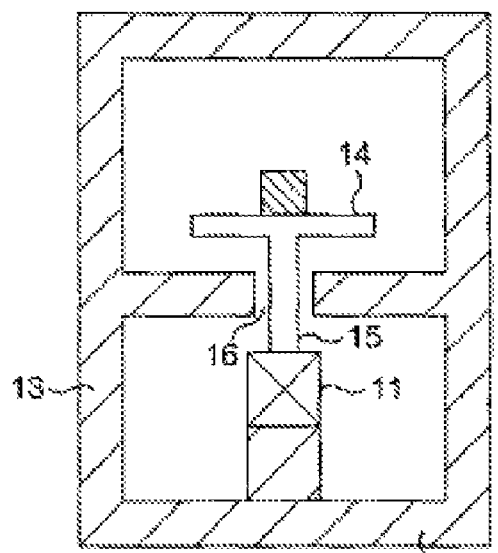
FIG. 2 is a schematic sectional view, from one side, through a second known weighing apparatus.
Figure 3:
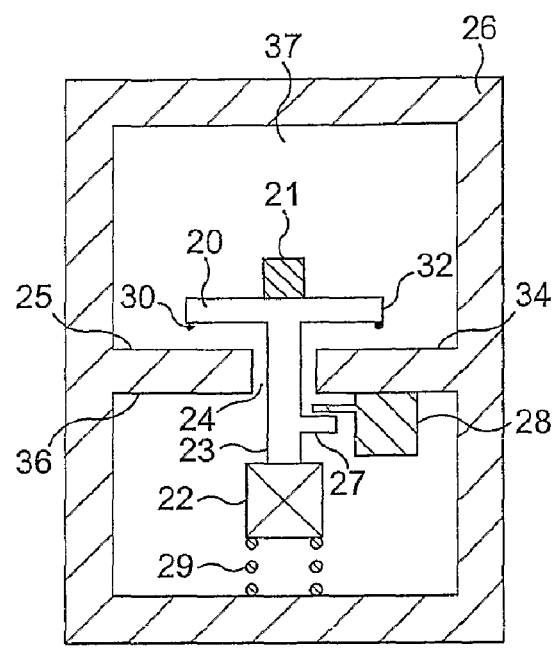
FIG. 3 is a schematic sectional view, from one side, through a weighing apparatus in accordance with a first embodiment of the present invention, the apparatus being in an unsealed configuration.
Figure 4:
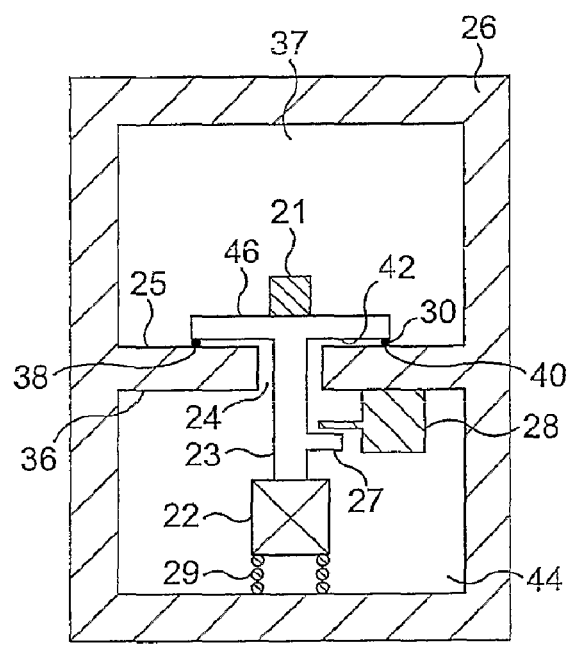
FIG. 4 is a schematic sectional view, similar to FIG. 3, of the weighing apparatus of FIG. 3 in a sealed configuration.

FIGS. 3 and 4 illustrate a weighing apparatus in accordance with a first embodiment of the present invention, with the apparatus being in an unsealed configuration in FIG. 3 and in a sealed configuration in FIG. 4. It can be seen that the weighing apparatus of FIGS. 3 and 4 is of a similar principle of construction as that of the known apparatus of FIG. 2 in that a weighing pan 20, in use supporting a load 21 to be weighed, is located above a load cell 22 and coupled thereto via an elongate rigid member 23 extending upwardly from the load cell 22 to the pan 20 through a hole 24 in a frame 25 of the weighing apparatus 26. The rigid member 23 and the weighing pan 20 may be integral or separable. However, in accordance with the invention in addition the rigid member 23 has a laterally extending engagement arm 27 located beneath an actuator 28 attached to the frame 25 of the weighing apparatus 26. The arm 27 and the actuator 28 are mutually positioned and arranged so that the arm 27 can be selectively pressed downwards by the actuator 28 when the actuator 28 is operated. The engagement arm 27 is positioned so that when the actuator 28 is not energised to press down on the engagement arm 27 there is no connection between the engagement arm 27 and any part of the frame 25 or actuator 28. In an alternative arrangement the actuator 28 may be arranged to press down on the weighing mechanism instead of or as well as on the arm 27 so that the weighing mechanism does not become overloaded. In some arrangements the elongate member 23 could be pushed down further so that it becomes decoupled from the weighing pan 20.

The load cell 22 is mounted upon a compliant element 29, such as a helical spring, which enables the load cell 22, and consequently the rigid member 23 and pan 20 mounted on the load cell 22, to move down when the engagement arm 27 is pressed down by the actuator 28. The compliant element applies an upwardly directed bias to the rigid member 23 against which bias the actuator 28 applies the downwardly directed force.

The pan 20 is fitted with a sealing element 30 around an edge 32 thereof so that, as the pan 20 is indirectly pressed down by the actuator 28, the sealing element 30 bears downwardly against an upper surface 34 of a floor 36 of a weighing chamber 37, defined by the frame 25, underneath the pan 20. In this way, as shown in FIG. 4 an annular seal 38 is provided around a junction 40 between a bottom surface 42 of the pan 20 and a mechanism chamber 44 in the weighing apparatus 26, which is defined by the frame, including the floor 36. The mechanism chamber 44 contains the weighing mechanism, including the load cell 22. This seals against liquids entering the mechanism chamber 44, which could otherwise damage the weighing mechanism, and provides a smooth and continuous path between on the one hand the upper surface 34 of the floor 36 underneath the pan 20 and on the other hand the upper surface 46 of the pan 20 in the weighing chamber 37.

Thus, as shown in FIG. 3, when the actuator 28 is not energised the pan 20 is completely free of contact with fixed surfaces but, as shown in FIG. 4, when the actuator 28 is powered both the pan 20 and floor 36 of the weighing chamber 37 are sealed, mechanically supported and easy to clean, and the rigid member 23, and the pan 20 if affixed thereto, are clamped.

The arrangement shown in FIGS. 3 and 4 is only one example of how the seal between the pan and the weighing mechanism may be arranged. Many other arrangements are possible and the selected arrangement would depend upon the structure of the weighing apparatus to be used and the requirements for containing the object to be weighed. The design of the seal will depend upon the specific requirements. These will include but are not limited to (a) a metal to metal face seal where the flatness of the two surfaces combined with the actuation force provides the seal; (b) an O-Ring mounted in a groove on the underside of the pan or on the top surface of the floor; (c) a moulded elastomeric gasket attached to the rim of the pan shaped to provide a smooth upper surface over the interface; (d) a co-moulded pan where the rim is made of a flexible elastomeric material and the central area is made of a rigid material; or (e) an annular sheet of flexible material extending radially outward from the pan which settles flat over the floor of the chamber.

Figure 5:
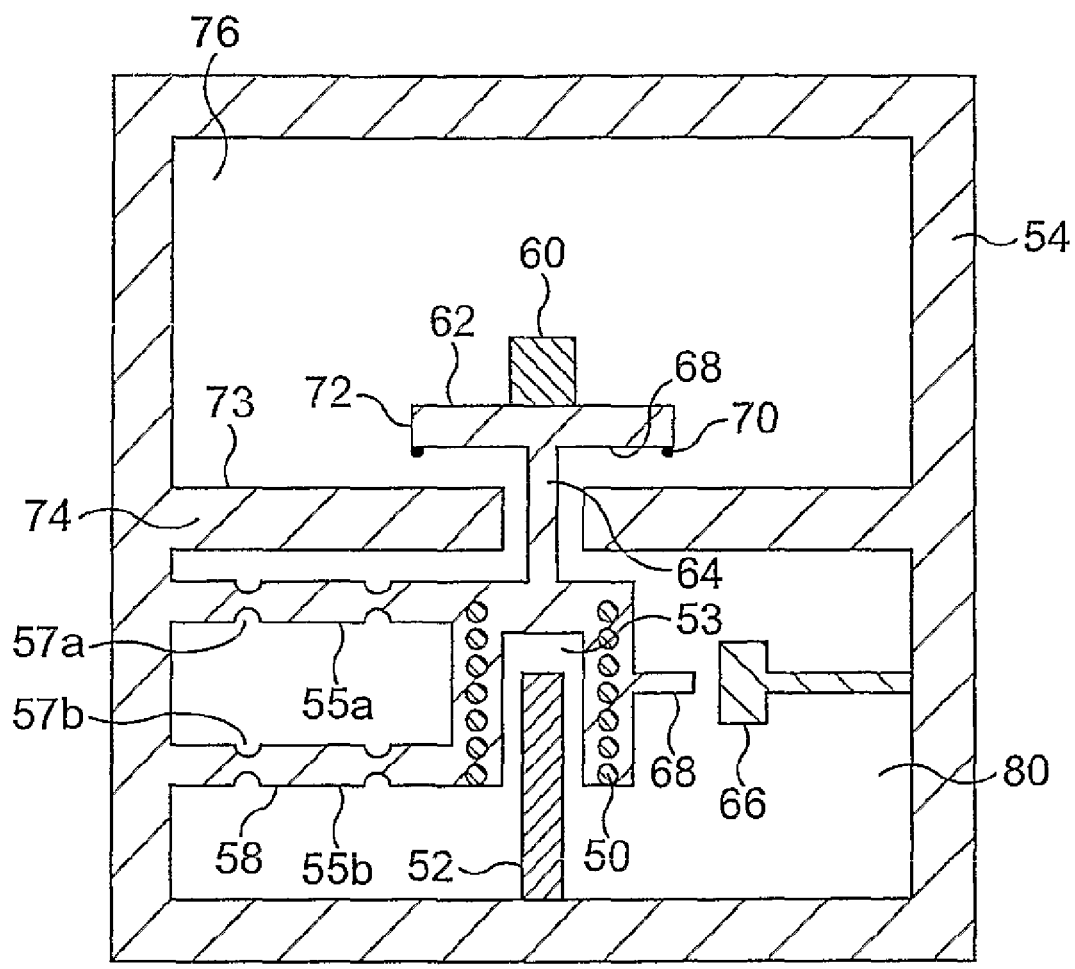
FIG. 5 is a schematic sectional view, from one side, through a weighing apparatus in accordance with a second embodiment of the present invention, the apparatus being in an unsealed configuration.

One example of a different arrangement is shown in FIG. 5 which shows a weighing apparatus in accordance with a second embodiment of the present invention, the apparatus being in an unsealed configuration.

In this embodiment the weighing apparatus consists of a current balance. A current balance, which is generally known, uses a coil carrying an electric current and constrained to move axially relative to a magnetic field generated by a permanent magnet. A force is generated by the electric current such that the coil is pushed axially with respect to the permanent magnet. In the arrangement where the coil supports the object to be weighed and the permanent magnet is fixed to a framework of the weighing apparatus, then the current required to hold the object away from the framework is linearly proportional to its weight. Such a current balance is well known and available commercially, for example from the companies Sartorius or Mettler Toledo.

In the arrangement shown in FIG. 5, a coil 50 is wound cylindrically and arranged co-axially with a longitudinally and upwardly oriented permanent magnet 52 which extends into an upwardly oriented cylindrical cavity 53 defined by the coil 50. The permanent magnet 52 is rigidly attached to a frame 54 of the weighing apparatus 56. The coil 50 is attached to the frame 54 via a flexure linkage 58, preferably in the form of a parallelogram having upper and lower horizontal arms 55a, 55b each with a flexure point 57a, 57b. This flexure linkage 58 enables the coil 50 to move axially over a short distance without tilting and with very little force. The object to be weighed 60 is placed upon a pan 62 which is rigidly connected to the coil 50 via an upwardly extending rigid connector 64. The arrangement is illustrated simplistically here for clarity. In practical balances, the geometry is more complex, although however the principle is the same.

The coil 50 is energised by a servo control system (not shown), which is well known, in such a way that the position of the coil 50 is always held constant as measured by a sensor 66 which monitors the position of a laterally extending arm 68 attached to, or part of, the moving coil 50. In this position, the current would increase if any weight is added and this current increase would be proportional to the added weight.

In the same manner as in the embodiment of FIGS. 3 and 4, the pan 62 is fitted with a sealing element 70 around an edge 72 thereof so that, as the pan 62 is pressed down, the sealing element 70 bears downwardly against an upper surface 73 of a floor 74 of a weighing chamber 76, defined by the frame 54, underneath the pan 62. In this way, an annular seal is provided around a junction between a bottom surface 78 of the pan 62 and a mechanism chamber 80 in the weighing apparatus. The mechanism chamber 80 contains the weighing mechanism, including the coil 50 and the permanent magnet 52. This seals against liquids entering the mechanism chamber 80, which could otherwise damage the weighing mechanism and provides a readily cleanable surface in the bottom of the weighing chamber 76. As for the embodiment of FIGS. 3 and 4, the seal can be formed by a selected one of a variety of different sealing devices or structures.

With this type of weighing apparatus the coil 50 and the permanent magnet 52 can also be used as an actuator 54 to move the pan 62 to the sealed position. This may be achieved by reversing the direction of the current in the coil 50 thus generating a downward force rather than an upward force on the pan 62. The resulting downward motion is halted as the pan 62 is sealed against the weighing chamber floor 74 by the sealing element 70.

For systems not using a current balance and where it is not possible to modify the weighing apparatus or mount actuators within the weighing mechanism compartment then an actuator could be mounted in the weighing chamber arranged to push downwards on to the top surface of the pan until it seals.

The invention claimed is:

1. A weighing apparatus comprising a weighing pan for supporting on an upper surface thereof an object to be weighed, an elongate member connected thereto, the elongate member extending through a hole and connecting the weighing pan to a weighing mechanism, the hole being provided in a barrier formed in between a weighing pan region and a weighing mechanism region, and a drive means for selectively moving the weighing pan and the elongate member between a first position in which the weighing pan and member are spaced from the barrier and a second position at which at least one of the weighing pan and elongate member-contacts the barrier in a sealing relationship for preventing material in the weighing pan region from passing through the hole into the weighing mechanism region.

2. An apparatus according to claim 1, wherein the elongate member extends downwardly from the weighing pan and supports the pan by contacting a lower surface of the weighing pan, the barrier is a floor, located beneath the weighing pan, of the weighing pan region, the weighing mechanism being located beneath the floor of the weighing pan region in the weighing mechanism region of the apparatus, and the first position is an upper position, at which the weighing pan is spaced from the floor, and the second position is a lower position, at which the weighing pan contacts the floor in a sealing relationship.

3. An apparatus according to claim 1 further comprising a sealing device located on at least one of the weighing pan, the elongate member and the barrier for effecting the sealing relationship therebetween when the weighing pan is at the second position.

4. An apparatus according to claim 3 wherein the sealing device comprises at least one sealing element provided on the lower surface of the weighing pan.

5. An apparatus according to claim 3 wherein the sealing device extends circumferentially around the weighing pan and/or the elongate member.

6. An apparatus according to claim 1 wherein the weighing mechanism is connected to a lower end of the elongate member.

7. An apparatus according to claim 1 wherein the weighing mechanism region is located in a chamber of the weighing apparatus which is sealed when the weighing pan and the barrier are in a sealed relationship.

8. An apparatus according to claim 1 wherein the drive means comprises an actuator for selectively applying a force on the elongate member thereby to urge the weighing pan and the elongate member into the second position.

9. An apparatus according to claim 8 wherein the actuator applies a downwardly directed force to a laterally extending arm of the elongate member.

10. An apparatus according to claim 9 wherein the weighing mechanism comprises a load cell.

11. An apparatus according to claim 8 further comprising a compliant element for applying a bias to the elongate member against which bias the actuator applies the force.

12. An apparatus according to claim 11 wherein the bias of the compliant element is upwardly directed and the force of the actuator is downwardly directed.

13. An apparatus according to claim 1 wherein the weighing mechanism comprises a coil, the coil being connected to the lower end of the elongate member, a flexural mount for the coil flexibly connecting the coil to a frame of the weighing apparatus to enable the coil to move relative to a permanent magnet which is attached to a frame of the weighing apparatus whereby the coil can move relative to the permanent magnet.

14. An apparatus according to claim 13 wherein the drive means are comprised in the weighing mechanism and are adapted to urge the coil carrying the elongate member and the weighing pan downwardly to achieve the sealing relationship between the weighing pan and/or the elongate member and the barrier.

15. An apparatus according to claim 2 wherein the weighing mechanism comprises a coil, the coil being connected to the lower end of the elongate member, a flexural mount for the coil flexibly connecting the coil to a frame of the weighing apparatus to enable the coil to move relative to a permanent magnet which is attached to a frame of the weighing apparatus whereby the coil can move relative to the permanent magnet.

16. An apparatus according to claim 15 wherein the drive means are comprised in the weighing mechanism and are adapted to urge the coil carrying the elongate member and the weighing pan downwardly to achieve the sealing relationship between the weighing pan and/or the elongate member and the barrier.

17. An apparatus according to claim 3 wherein the weighing mechanism comprises a coil, the coil being connected to the lower end of the elongate member, a flexural mount for the coil flexibly connecting the coil to a frame of the weighing apparatus to enable the coil to move relative to a permanent magnet which is attached to a frame of the weighing apparatus whereby the coil can move relative to the permanent magnet.

18. An apparatus according to claim 17 wherein the drive means are comprised in the weighing mechanism and are adapted to urge the coil carrying the elongate member and the weighing pan downwardly to achieve the sealing relationship between the weighing pan and/or the elongate member and the barrier.

19. An apparatus according to claim 7 wherein the weighing mechanism comprises a coil, the coil being connected to the lower end of the elongate member, a flexural mount for the coil flexibly connecting the coil to a frame of the weighing apparatus to enable the coil to move relative to a permanent magnet which is attached to a frame of the weighing apparatus whereby the coil can move relative to the permanent magnet.

20. An apparatus according to claim 18 wherein the drive means are comprised in the weighing mechanism and are adapted to urge the coil carrying the elongate member and the weighing pan downwardly to achieve the sealing relationship between the weighing pan and/or the elongate member and the barrier.

* * * * *